(12) United States Patent
Bergman et al.

(10) Patent No.: US 8,070,566 B2
(45) Date of Patent: Dec. 6, 2011

(54) SKINNING BLADE CLAMP WITH FAT RELIEF GROOVES

(75) Inventors: Matthew A Bergman, Des Moines, IA (US); Matthew P Sawhill, Des Moines, IA (US); James L Myers, Urbandale, IA (US)

(73) Assignee: Townsend Engineering Company, Des Moines, IA (US)

( * ) Notice: Subject to any disclaimer, the term of this patent is extended or adjusted under 35 U.S.C. 154(b) by 936 days.

(21) Appl. No.: 11/053,782

(22) Filed: Feb. 9, 2005

(65) Prior Publication Data

US 2006/0178104 A1 Aug. 10, 2006

(51) Int. Cl.
*A22B 5/16* (2006.01)

(52) U.S. Cl. .................................. 452/129; 452/127

(58) Field of Classification Search .................. 452/125, 452/127, 128, 129, 130, 134, 143
See application file for complete search history.

(56) References Cited

U.S. PATENT DOCUMENTS

| | | | |
|---|---|---|---|
| 2,715,427 A * | 8/1955 | Townsend | 452/127 |
| 3,249,139 A | 5/1966 | Runnels, Jr. et al. | |
| 3,280,869 A | 10/1966 | Harrington et al. | |
| 3,360,026 A * | 12/1967 | Schill | 452/127 |
| 3,542,103 A | 11/1970 | Townsend | |
| 3,769,903 A | 11/1973 | Greider | |
| 3,931,665 A | 1/1976 | Townsend | |
| 4,417,367 A | 11/1983 | Leining | |
| 4,466,344 A * | 8/1984 | Schill | 452/127 |
| 4,606,093 A | 8/1986 | Townsend | |
| 4,649,604 A * | 3/1987 | Braeger | 452/127 |
| 4,730,368 A | 3/1988 | Townsend | |
| 4,793,026 A * | 12/1988 | Braeger et al. | 452/127 |
| 4,811,459 A * | 3/1989 | Townsend | 452/127 |
| 4,835,817 A * | 6/1989 | Jurs | 452/127 |
| 4,920,875 A * | 5/1990 | Schill | 99/589 |
| 5,011,454 A * | 4/1991 | Townsend | 452/125 |
| 5,211,097 A * | 5/1993 | Grasselli | 83/698.11 |
| 5,288,264 A * | 2/1994 | Braeger | 452/127 |
| 5,350,334 A * | 9/1994 | Holms | 452/127 |
| 5,609,519 A * | 3/1997 | Townsend | 452/127 |
| 5,766,066 A * | 6/1998 | Ranniger | 452/127 |
| 5,938,518 A * | 8/1999 | Bargele et al. | 452/127 |
| 6,086,470 A | 7/2000 | Ranniger | |
| 6,357,346 B1 | 3/2002 | Townsend | |
| 6,458,025 B1 * | 10/2002 | Hamblin | 452/127 |
| 6,589,108 B2 * | 7/2003 | Townsend | 452/125 |
| 6,856,852 B1 * | 2/2005 | Bruinsma et al. | 700/177 |

FOREIGN PATENT DOCUMENTS

| | | | |
|---|---|---|---|
| EP | 0707797 | * | 4/1996 |
| WO | WO 02/062148 A1 | | 8/2002 |

* cited by examiner

Primary Examiner — David Parsley

(57) ABSTRACT

A meat skinning device having a clamp and a shoe that holds a blade therebetween, the clamp having at least one groove that extends from one edge of the clamp to the other.

5 Claims, 2 Drawing Sheets

SKINNING BLADE CLAMP WITH FAT RELIEF GROOVES

BACKGROUND OF THE INVENTION

This invention is directed toward a meat skinning machine and more specifically, a clamping mechanism for holding a blade of a meat skinning machine.

Meat skinning machines are well known in the art and typically have a gripper roll with a plurality of teeth positioned underneath and adjacent to an elongated sharp cutting blade which is held in place by a shoe and a clamp that binds the blade between the clamp and the shoe. As the meat is moved toward the blade, it is gripped by the teeth on the gripper roll which draws the meat product into contact with the blade whereby a layer of skin is cut from the meat and pulled between the gripper roll and the shoe while the meat moves upwardly over the blade and the clamp.

A problem that has plagued skinning machines is that during trimming a layer of fat is received between the shoe and the clamp which builds up separating the shoe and the clamp and pushing the blade outwardly. As a result, as the blade extends outwardly, a cut thicker than desired will occur or the blade will be displaced causing safety problems. Also, the fat build up tends to cause undue stress on locking pins and screws used to secure the clamp to the shoe. Therefore, a need exists for a means to maintain the position of the blade without additional clamping force.

A principal object of the present invention is to provide an improved clamping mechanism for a meat skinner that reduces fat buildup between the clamp and shoe.

Another object of the present invention is to provide for an improved clamping mechanism that will maintain the blade in a desired position.

Another object of the present invention is to provide a meat skinning device that is safer to use and maintain.

Another object of the present invention is to provide a meat skinning device that reduces wear on locking pins and screws.

These and other objects, features, or advantages of the present invention will become apparent from the specification and claims.

BRIEF SUMMARY OF THE INVENTION

The meat skinning machine has a frame that supports an elongated cylindrical gripper or tooth roll that is rotatably mounted within the frame on a shaft. The skinner additionally has a shoe that partially embraces the gripper roll and a clamp that is secured to the shoe using a lock pin and an adjustable lock screw. Within the clamp there is a shallow step that receives a blade such that when the adjustable lock screw is tightened, the blade will become compressed between the clamp element and the shoe. The clamp element or the shoe is specially designed to have at least one groove extending from one edge of the clamp or shoe to the opposite edge or from the rear edge of the shallow step of the clamp or shoe to the opposite edge.

DESCRIPTION OF THE PREFERRED EMBODIMENTS OF THE INVENTION

Figure 1:
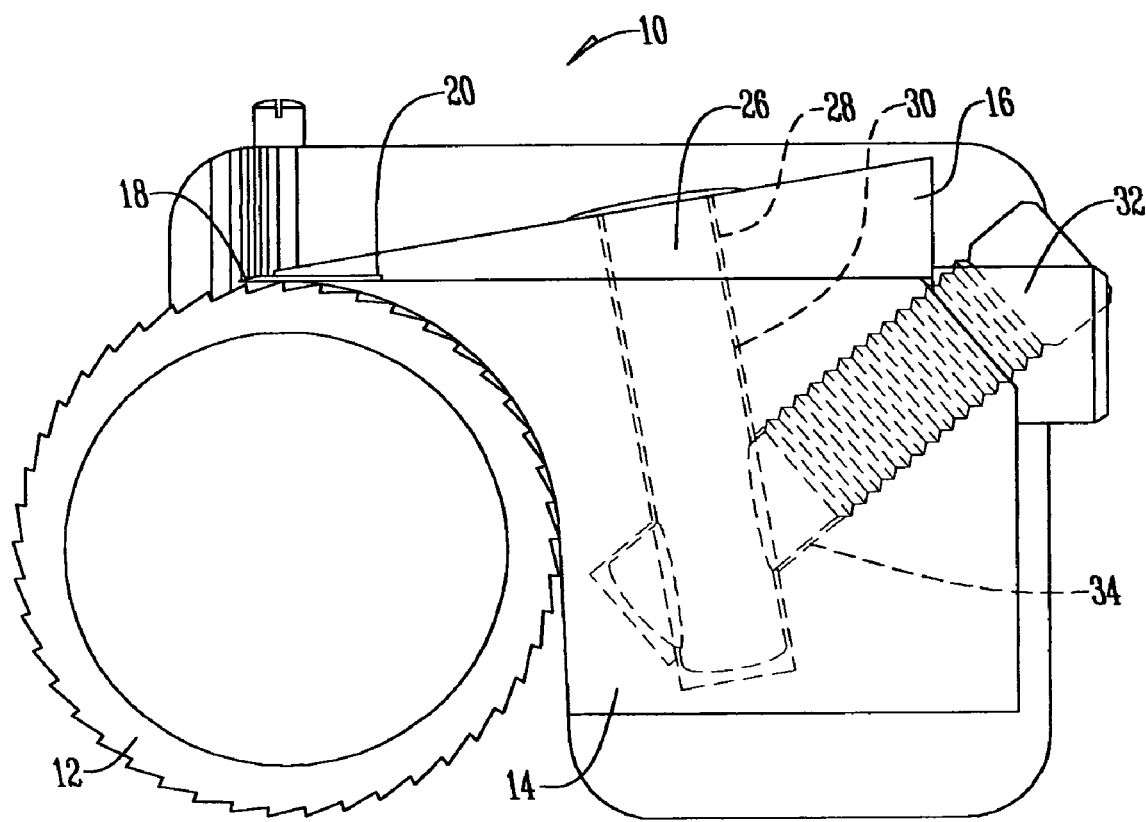
FIG. 1 is a side elevational view of a skinning machine.

With reference to FIG. 1, a skinning machine 10 has an elongated cylindrical gripper roll 12 mounted to a frame (not shown). A shoe 14 partially embraces the gripper roll 12 in conventional fashion. A clamp 16 is secured to the shoe 14 in any convenient way and clamps the elongated cutting blade 18 between the clamp 16 and the shoe 14 closely adjacent the peripheral outer surface of the gripper roll 12.

Figure 2:
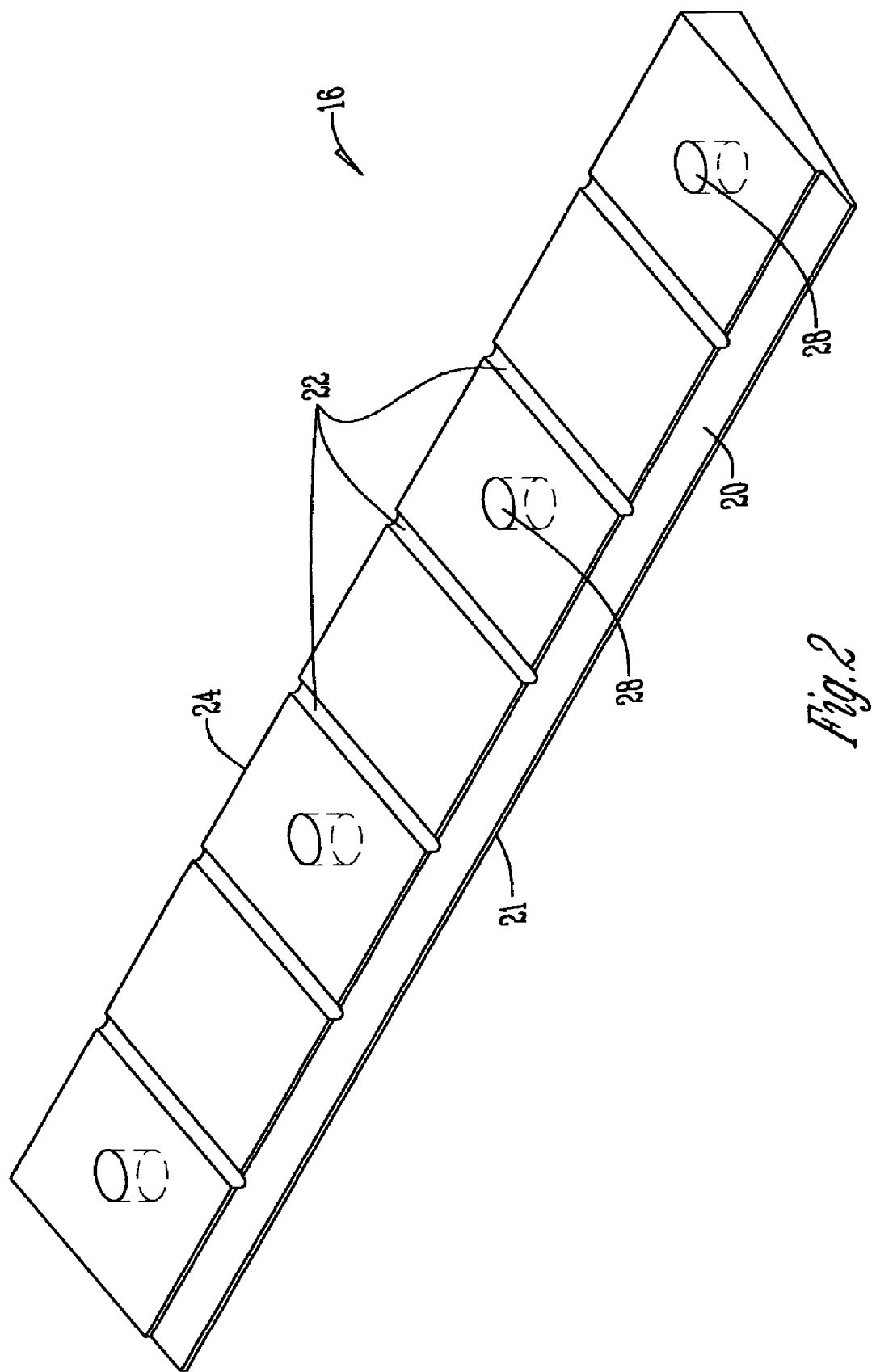
FIG. 2 is a perspective view of the clamp element with grooves.

The clamp 16 is an elongated member having a shallow step 20 near its forward edge 21 and extending along the length of the clamp 16 for receiving the elongated cutting blade 18. As shown in FIG. 2, at least one elongated groove 22 extends transversely from the shallow step 20 on the clamp 16 to the opposite or back edge 24 of the clamp. Preferred is a plurality of grooves 22. Alternatively, the grooves 22 are positioned within the shoe 14 or within both the shoe 14 and the clamp 16. Also, in an alternative embodiment, the groove 22 extends from the first edge 21 to the opposite edge 24.

The clamp 16 is secured to the shoe 14 in any conventional manner to provide clamping force to the blade 18. For example, a locking pin 26 with an opening is inserted through a slot 28 in the clamp 16 that is aligned with a slot 30 in the shoe 14. A locking screw 32 extends through a second slot 34 in the shoe 14 that is in communication with the first slot 30 such that the locking screw 32 engages the opening of the locking pin 26. As the locking screw 32 is threaded into slot 34, the end of the screw extends through the opening in the locking pin 26 exerting downward force on the pin 26 which in turn exerts downward force on the clamp 16 to clamp the blade 18 between the clamp 16 and the shoe 14.

In operation, the blade 18 is clamped between the clamp 16 and the shoe 14 such that the blade extends a desired distance. As the meat product is drawn toward the skinning machine 10 by the gripper roll 12, the blade 18 engages the meat product separating a layer of skin and fat from muscle. As a layer of fat is received between the shoe 14 and the clamp 16 the fat layer is forced into the grooves 22 and passes through the grooves 22 to drain out the back edge. As a result, fat does not build up between the shoe 14 and the clamp 16 to displace the blade 18 and less wear occurs in regard to the locking pin 26 and screw 32. Thus, the groove 22 extends along a surface of the clamp 16 that engages the shoe 14 such that a layer of fat received between the clamp 16 and shoe 14 passes through the groove 22 to drain out the second edge 24.

It will be appreciated by those skilled in the art that other various modifications could be made to the device without departing from the spirit of the scope of this invention. All such modifications and changes fall within the scope of the claims and are intended to be covered thereby.

What is claimed is:

1. A meat skinning device, comprising:
   a shoe;
   a clamp connected to the shoe, the clamp having a groove that extends transversely from a first edge to a second edge; and
   a blade positioned between the clamp and the shoe and extending outwardly therefrom; and
   wherein the groove extends along a surface of the clamp that engages the shoe such that a layer of fat received between the clamp and shoe passes through the groove to drain out the second edge.

2. The device of claim 1 wherein the clamp has a shallow step that extends longitudinally along the first edge of the clamp.

3. The device of claim 2 wherein the blade is received within the shallow step.

4. The device of claim 2 wherein the groove extends transversely from the shallow step to the second edge.

5. The device of claim 1 wherein there is a plurality of grooves.

* * * * *